United States Patent [19]

Hope

[11] 4,003,259

[45] Jan. 18, 1977

[54] METHOD AND A DEVICE FOR CAPACITIVE LEVEL MEASUREMENT

[75] Inventor: Bjorn Reinhardt Hope, Lommedalen, Norway

[73] Assignee: Navaltronic A/S, Oslo, Norway

[22] Filed: June 10, 1975

[21] Appl. No.: 585,609

[30] Foreign Application Priority Data

June 10, 1974 Norway .............................. 2093/74

[52] U.S. Cl. .............................. 73/304 C; 317/246
[51] Int. Cl.² ......................................... G01F 23/26
[58] Field of Search ............ 73/304 C, 398 C, 308, 73/313, 304 R, DIG. 5; 317/246

[56] References Cited
UNITED STATES PATENTS

| | | | |
|---|---|---|---|
| 2,511,398 | 6/1950 | Giers et al. | 317/246 |
| 3,443,438 | 5/1969 | Martin et al. | 73/304 R |
| 3,473,381 | 10/1969 | Allen | 73/313 |
| 3,505,869 | 4/1970 | Crawford | 73/313 |
| 3,646,293 | 2/1972 | Howard | 73/313 |

*Primary Examiner*—Donald O. Woodiel
*Attorney, Agent, or Firm*—Howson and Howson

[57] ABSTRACT

Capacitive level measurement apparatus comprising two sets of interdigitated capacitive elements arranged along the vertical direction for immersion in a liquid or the like, and a switch arrangement with external connections which provide sequential measurement of the electrical capacity between successive pairs of adjacent capacitive elements, from which information the level of the liquid is determined. Preferably the switches are inside an assembly of the capacitive elements, and special means are preferably used to effect the desired sequential switch actuation.

25 Claims, 15 Drawing Figures

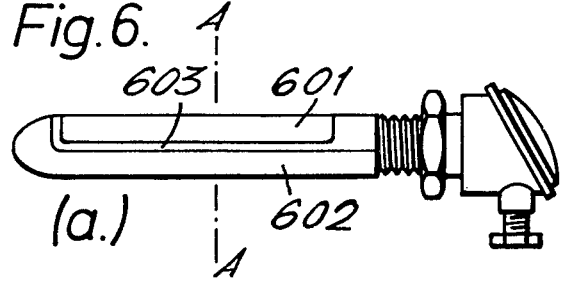
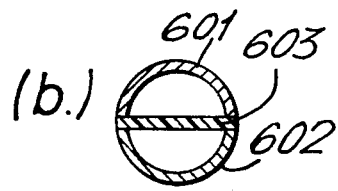
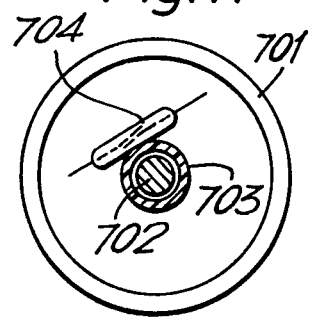
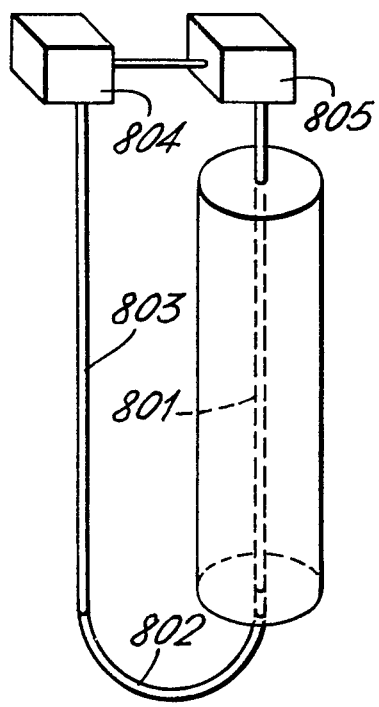
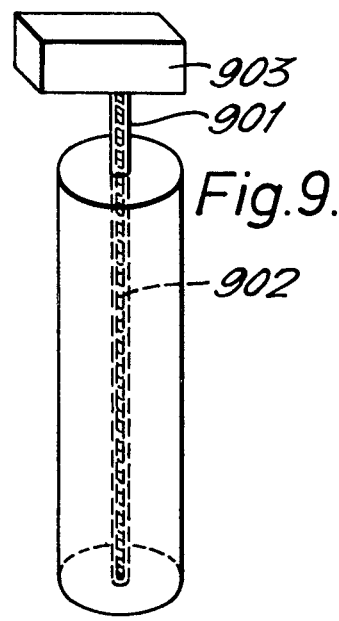

METHOD AND A DEVICE FOR CAPACITIVE LEVEL MEASUREMENT

The present invention relates to a method and a device for capacitive level measurement of freely flowing substances such as liquids, granules, solids, or combinations of the same.

Numerous devices for capacitive level measurements are known. Generally, the level measurement is based on a change in the dielectric constant between two electrodes of a capacitor or a group of such electrodes if several levels are to be measured. In some devices the medium to be measured penetrates between the two electrodes, which causes a change in the dielectric constant and, thus, a capacitive change. If the medium is viscous, it could, however, easily cause contamination and possibly block up the space between the electrodes.

In measuring explosive substances it is, furthermore, even dangerous to work with too high voltages across the capacitors.

From the U.S. Pat. No. 3,010,320 a liquid level measuring device is known, which consists of a column having coaxially arranged annular means each serving as an electrode of a first capacitor. The wall of the container wherein the device is arranged serves as the second electrode and is a common second electrode to said first electrodes. The U.S. device embodies several substantial disadvantages. Good measurement results, inter alia, require a high voltage between said two electrodes, which is obviously not permissible for measuring explosive substances. The operative method used, i.e. the use of a bridge circuit for the registration of an unbalance, is also quite complicated and expensive. An even more important disadvantage of the solution according to said U.S. specification is the large number of wires required to connect each annular electrode of the liquid level measuring device. Such a large number of wires causes significant wire capacities, which in turn influence the accuracy of measurement. This is quite obvious, since the difference between dielectric constants of air and e.g. paraffin and oil is relatively small ($\epsilon$ air: 1, $\epsilon$ paraffin: 1.7–2.3). With a large number of wires it will also be difficult to arrange a long measuring column.

It is an object of the present invention to eliminate said disadvantages and to provide a simple and reliable level measuring device.

The characterizing features of the level measuring device according to the invention will appear from the claims as well as from the following description with reference to the drawings.

Figure 3:
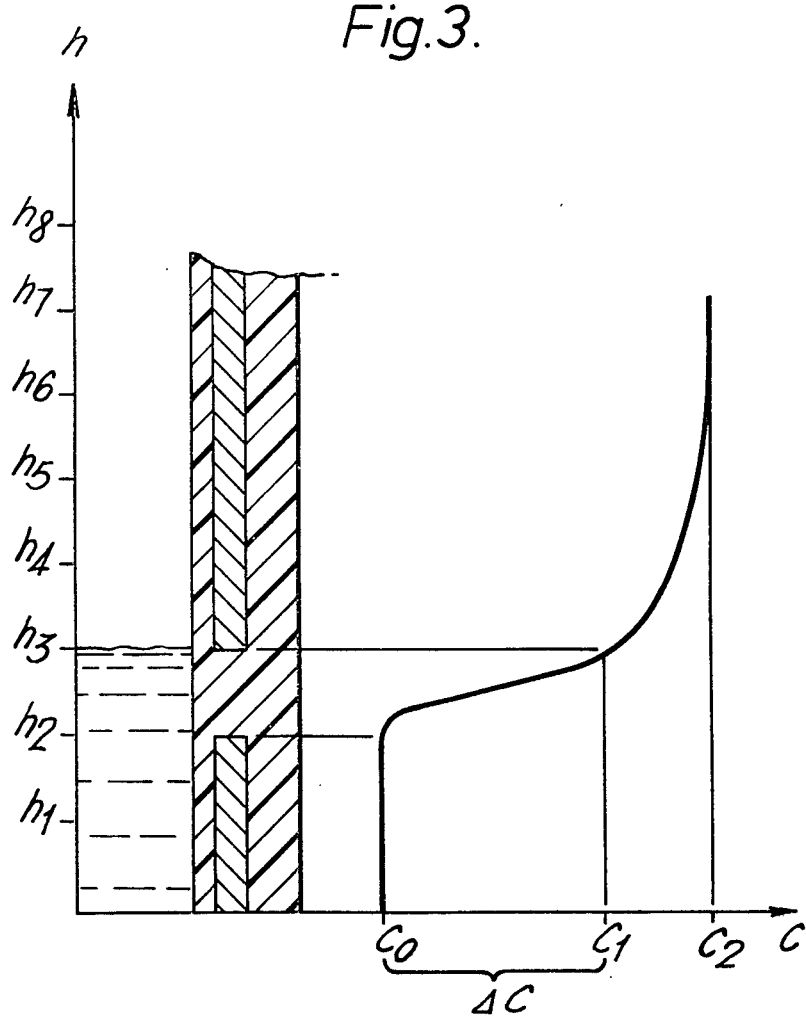

FIG. 3 diagramatically illustrates the change in capacity in relation to the increase in liquid level.

Figure 1:
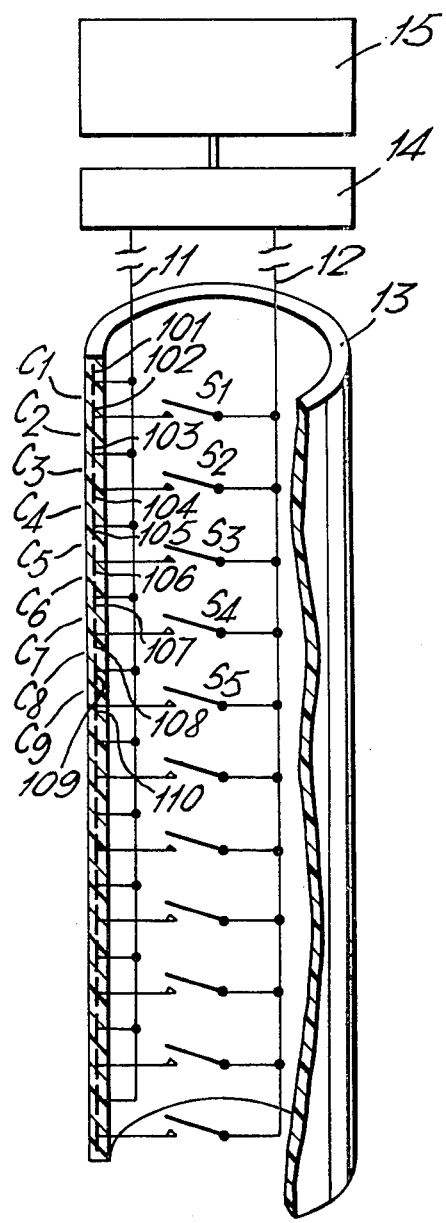
FIG. 1 illustrates the principle of the level measuring device according to the invention.
Figure 2:
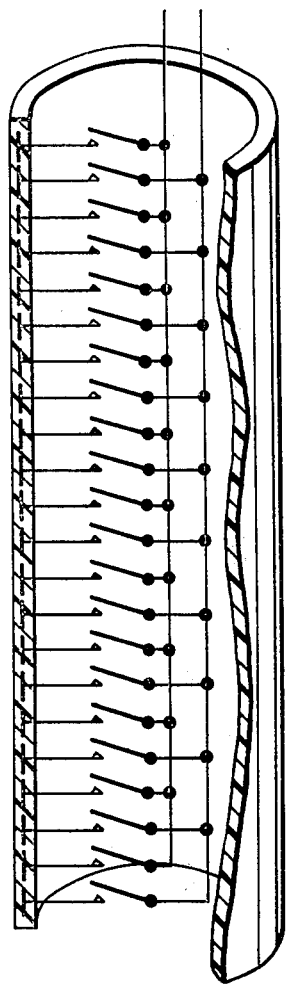
FIG. 2 is a modification of the embodiment according to FIG. 1.
Figure 4:
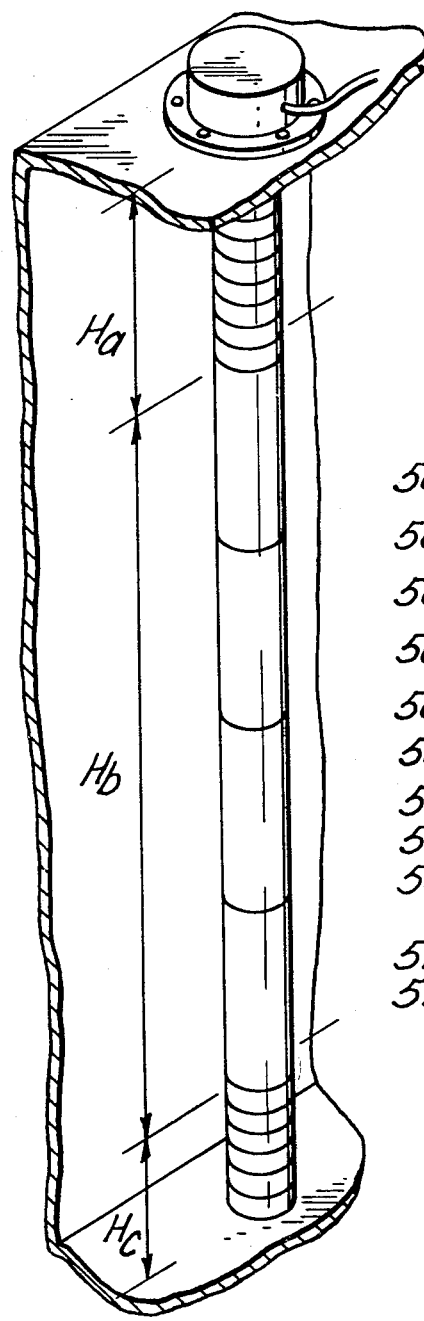

FIG. 4 illustrates a level measuring device in a tank suitable for use in the embodiments of FIG. 1 or FIG. 2.

Figure 5:
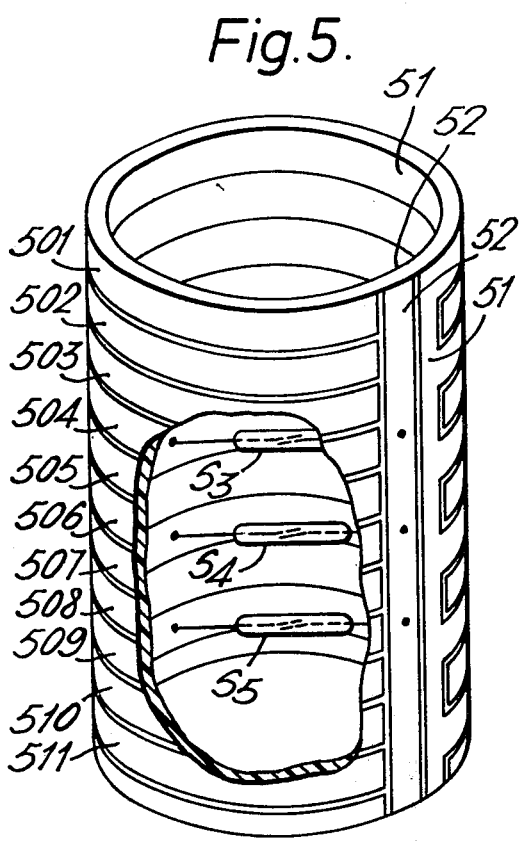

FIG. 5 is a detailed view of a section of a measuring column suitable for use in the embodiment of FIG. 1.

FIG. 6($a$) is a side view of a level measuring device for measuring absolute levels and, FIG. 6($b$) is a sectional view taken along lines A—A of FIG. 6($a$).

FIG. 7 illustrates the arrangement of a magnetically influenced switch suitable for use in the measuring column of FIGS. 1 or 2.

FIG. 8 is a view of a first embodiment of a magnet guide means through the measuring column, suitable for use in the column of FIGS. 1 and 2.

FIG. 9 shows a second embodiment of the magnet guide means through the measuring column, suitable for use in the column of FIGS. 1 or 2.

Figure 10:
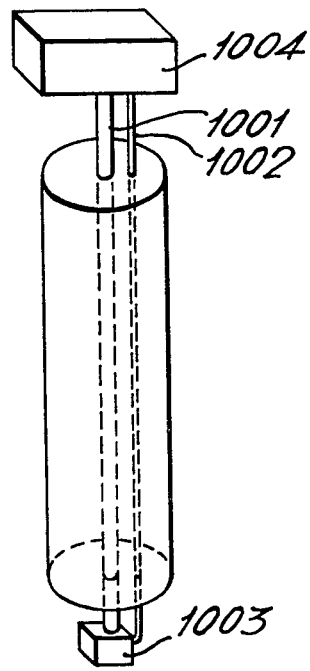

FIG. 10 shows a third embodiment of the magnet guide means through the measuring column, suitable for use in the column of FIGS. 1 or 2.

Figure 11:
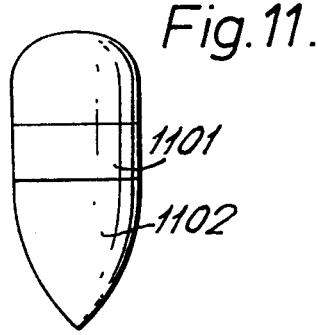
Figure 12:
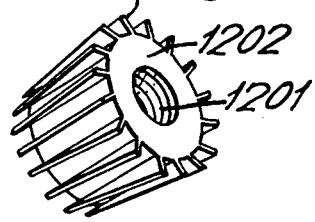

FIGS. 11 and 12 show preferred embodiments of a magnet for coaction with the magnet guide means according to FIGS. 8–10.

Figure 13:
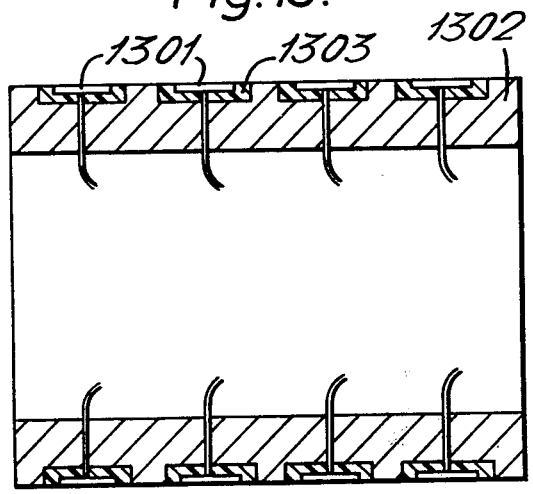
Figure 14:
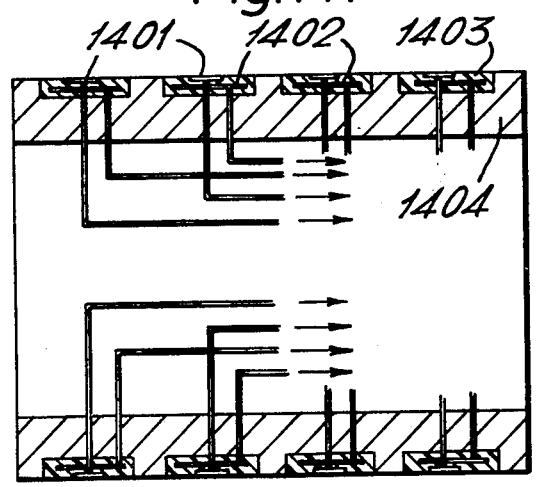

FIGS. 13 and 14 show sections of alternative embodiments of the level measuring column according to the invention, drawn in a horizontal rather than a vertical orientation.

In FIG. 8 a level measuring device is shown schematically and partially in section, so as to illustrate the operation of said device.

In order to reduce wire capacities only two main conductors 11 and 12 are used. Adjacent vertical capacitive elements 101, 102, 103, 104, 105, 106, 107, 108, 109, 110 etc., in vertical array, form pairs of plates of the capacitors $C_1$, $C_2$, $C_3$ . . . . $C_9$ etc.

The capacitive elements are preferably arranged as annular means around the column 13 with insulating means interposed between said annular elements. Alternatively, the capacitive elements are produced as printed circuits or patterned foils, e.g. of metal sheet or a conductive material of some other kind, which is arranged around the column in a suitable manner. Every second capacitive element is connected to the first common conductor 11, which may be connected to earth or have the same potential as the tank wall, whereas every intermediate element can be connected through respective switches, like $S_1$, $S_2$ . . . etc. to a second common conductor 12. Said switches may for example be magnetically or electro-magnetically operated reed switches or the like. The capacitor elements 101, 102 etc. may be electrically insulated from the ambient medium. The inside of the level measuring device is also supposed to be entirely insulated from the medium to be measured.

The operation of the level measuring device is now to be described in detail with reference to FIG. 1 and to some examples:

1. It is assumed that the level measuring device is arranged in a tank containing air and oil. The level for example rises to reach the capacitor element 105. The value of capacitance of a capacitor is, as known, proportional to the dielectric constant ($\epsilon$ air : 1, $\epsilon$ oil : 2). The switches $S_1$, $S_2$ etc. are then closed and opened in turn, respectively. If we assume that the capacitance between two capacitive elements, with only air present in the tank, is equal to C and that the corresponding value for oil is 2C, the following measured values are obtained (the capacitors being connected in parallel):

$S_1$ closed: $C + C = 2C$
$S_2$ closed: $C + C = 2C$
$S_3$ closed: $2C + 2C = 4C$ In other words, the last case in which the total capacitance measured is 4C instead of 2C shows that the liquid level is at the element 105.

It is now assumed that the liquid level rises above the element 105 and reaches the element 104; the successive measurement will now result in the following values:

$S_1$ closed: $C + C = 2C$
$S_2$ closed: $C + 2C = 3C$
$S_3$ closed: $2C + 2C = 4C$ It is thus obvious that the oil level is at the element 104, because of the increase in measured capacity from 2C to 3C when $S_2$ is closed.

2. If the tank contains air, oil and water and we assume that $\epsilon$ air = 1, $\epsilon$ oil = 2, $\epsilon$ water = 80, and that the water level is at the element 108, and that there is oil between the element 108 and the element 104 and air from the element 104 upwards, the successive measurements will result in the following values:

$S_1$ closed: $C + C = 2C$
$S_2$ closed: $C + 2C = 3C$
$S_3$ closed: $2C + 2C = 4C$
$S_4$ closed: $2C + 80C = 82C$
$S_5$ closed: $80C + 80C = 160C$ The measured capacitive value may be included as the capacitance of a resonant cirucit with an associated detector, or form the frequency determining part of an oscillator, where the frequency is a function of the capacitance. Said oscillator or resonance circuit is part of the signal processor 14. $\epsilon$ being different for the different mediums, $n$-1 resonant circuit frequencies could in fact be formed for $n$ mediums. Block 15 indicates a suitable display or indicator device. It may for example be of a printer type or embodying numerical display.

FIG. 2 illustrates a variant of FIG. 1, the only difference being that the two switches are closed and opened respectively simultaneously so that only one capacitor $C_1$, $C_2$ etc. at a time is measured. This embodiment may be suitable in case there is no need for very accurate measurements, e.g. one test point for each 10 cms. change in level.

FIG. 3 illustrates the change in capacitance $\Delta C$ due to an increase in liquid or medium level from one element across the intermediate space to the next. As appears from the figure, the change in capacitance is greatest as the medium level passes through the distance $h_2$–$h_3$. Thus, a significant change in capacitance results from a change in level from one element to the next.

From FIG. 4 it is shown how a level measuring column may be mounted for example in a tank. The top portion $H_a$ of the measuring column is made for great measuring accuracy, e.g. with 20 test points per meter. The middle portion $H_b$ is made for somewhat less accuracy, e.g. with 3 test points per meter, whereas the lower portion $H_c$ has the same accuracy as the top portion.

In FIG. 5 part of a measuring column as illustrated in FIG. 1 is shown. The annular elements 501, 502 . . . correspond to the annular elements 101, 102 . . . in FIG. 1. In the embodiment according to FIG. 5, the two common conductors 51, 52 constitute part of the printed circuit or pattern. It is, however, apparent that said annular elements may consist of other suitable electrically conductive materials with a shape preferred with respect to the prevailing conditions. In a suitable production of the column, the installation procedure may be greatly simplified. Obviously, several solutions for the connection of the switches or reed switches will be feasible. Also, the column may be produced from separate capacitor rings with intermediate insulating rings and in such a manner that these means are easily joined and secured together. The conductor 52 is preferably connected to earth or has the same potential as the tank wall.

The measuring column according to the invention has the essential advantage that the connections to portions of the column are simplified because the number of terminals is reduced. This naturally also reduces the production costs for the intermediate portions between each column piece. The switches, i.e. the reed switches in the preferred embodiment, can be opened and closed in a suitable manner by a magnet extending through the column (FIG. 7) or electro-magnetically by time division multiplexing. Because the conductor capacitances should be kept as low as possible, it will be most suitable to place each multiplex unit directly at each reed switch respectively.

When the measuring column is mounted, it might be suitable to provide its exterior with a thin, electrically insulating coating, and optionally, to fill the column with an insulating material, e.g. a plastics material, to prevent any unintentional penetration of the medium or mediums to be sensed into said column.

The level measuring device disclosed in FIG. 6 comprises only two capacitive elements 601 and 602, which are mutually insulated by an insulating layer 603. Fundamentally, this measuring device functions like the one disclosed in FIG. 2, apart from the fact that it alone can only measure an absolute level.

FIG. 6b is a section A—A of the measuring device shown in FIG. 6a.

FIG. 7 illustrates how the magnet 702 can be moved vertically in a guide means 703, preferably arranged centrally in the column 701. When the magnet passes the reed switch 704, said switch will operate to connect a corresponding capacitive element of FIG. 1 or FIG. 2 to it corresponding main conductor.

In FIG. 8 a first embodiment of the guide means for the magnet is disclosed. The magnet is for example moved by pressurized oil from the housing 805, through the column in the guide means 801, the guide means passage 802 and the guide means 803 to the receiving housing 804, from which the magnet can be returned in the opposite direction. There will be a coordination of operations between the housings 804 and 805.

FIG. 9 discloses a second embodiment of the guide means, where a housing 903 operates a helical rod 902 extending through the guide means 901. When a magnet body, e.g. as shown in FIG. 12, is used, and the guide means is filled with a liquid, e.g. oil, the magnet can be screwed throughout the length of the guide means.

FIG. 12 illustrates how the magnet 1202 may be shaped, e.g. with fins 1203, which serve to counteract the rotation of the magnet around the rod 902, when said rod is rotated.

In FIG. 10 a third embodiment of the guide means for the magnet, e.g. shaped as disclosed in FIG. 11, is shown.

In FIG. 11 the reference numeral 1101 indicates the magnet per se, whereas 1102 indicates the residual streamlined body. The guide means is operated from the housing 1004, and the magnet body can run through a liquid in the guide means 1001 e.g. by means of gravity. When said body reaches the housing 1003, e.g. a pressure shock through the connection 1002 will cause the body to return to the housing 1004, and the operation is repeated.

To avoid static electricity in surroundings where there is danger of explosions, e.g. in an oil tank, it may be suitable to provide on the electrodes an exterior coating containing an electrically conductive substance, said coating preferably being synthetic material, e.g. an epoxy resin to which a carbonaceous component has been added.

Within the scope of the present invention it is naturally feasible to modify the level measuring devices. Thus, other switches than reed switches may be used, the construction of the capacitive means may be altered to be adapted to special measuring conditions and the choice of insulating materials can obviously be adapted to the mediums to be measured. Also, the magnet guide means as shown in FIGS. 8–10 may be modified to provide a more suitable operation of the device.

There are several advantages in the use of steel or another metal as a basic material in the measuring column. In this case, inter alia, every second element will be part of the column per se, which is connected to earth. Thus, the number of elements is reduced by one half. Additionally, advantages as to safety are achieved, since every second electrode can be non-insulated and directly connected to earth. A section of a segment of a level measuring column is disclosed in FIG. 13, where the reference numeral 1301 indicates the metal electrodes, 1302 the steel core and 1303 the insulating material and the column segment is drawn lying horizontally, on its side.

A possible disadvantage of this construction may be that the capacitance between the measuring electrode and earth is very high, i.e. that the relative change is small when measuring in oil and air. It is, however, possible to improve this condition either by applying a relatively thick layer of an insulating material or by placing a screening electrode between the measuring electrode and the steel core. Such an embodiment is disclosed in FIG. 14, where the reference numeral 1401 indicates measuring electrodes, 1402 screening electrodes, 1403 insulating material and 1404 the steel core.

The embodiments of the invention shown in the figures do not limit said invention, alternative embodiments being feasible within the scope of the invention.

I claim:

1. A method for capacitive measurement of the level of material, comprising providing at least a pair of vertically-oriented capacitive plates arranged in a position one above the other adjacent said material such that a substantial fringing electric field extends through a predetermined region between adjacent edges of said plates when a voltage is applied between one of said plates and the other of said plates; and sensing differences in the electrical capacity between said plates due to different levels of said material in said region.

2. The method of claim 1, in which a plurality of said pairs of plates are provided in a vertical array, and comprising the step of sequentially sensing any differences in capacitance between successively different pairs of immediately adjacent ones of said plates due to differences in level of said material in the fringing electric field region for said pairs of plates.

3. The method of claim 2, comprising providing said elements with their vertically-extending surfaces in vertical alignment.

4. The method of claim 3, comprising simultaneously connecting one element of each of said pairs to one terminal of capacity measuring means, and sequentially connecting the other elements of said pairs to another terminal of said capacity measuring means.

5. The method of claim 4, comprising sequentially connecting different pairs of said plurality to said capacity measuring means.

6. A method for capacitive level measurement of material, comprising providing adjacent said material a level measuring column consisting of two mutually interposed and mutually insulated groups of capacitive elements, sequentially connecting different elements of one of said groups to a first conductor while elements of said second group are connected to a second conductor, and measuring the electrical capacity exhibited between said conductors when one of said elements of said first group and at least one element of said second group are connected to their respective conductors to sense the level of said material by its effect on said measured capacity.

7. The method of claim 6, wherein said elements of said second group are all connected to said second conductor while said elements of said first group are being sequentially connected to said first conductor.

8. The method of claim 6, wherein said elements of said second group are sequentially connected to said second conductor in synchronism with said sequential connecting of said elements of said first group to provide sequential sensing of the capacity between successive adjacent pairs of said elements along said column.

9. Apparatus for capacitive level measurement of material, comprising:
a level measuring column comprising two mutually interposed groups of capacitive elements arranged at different heights adjacent said material, the elements of one of said groups being insulated from those of the other group;
first conductor means for making connection to said elements of a first of said groups;
a first array of plural switch means for sequentially connecting said first conductor means to successive different ones of said elements of said first group;
means for connecting at least one of said elements of said second group to said second conductor while said first switch means is connecting one of said first group of elements to said first conductor; and
means connected to said conductors for measuring the electrical capacity presented between said first and second conductors.

10. The apparatus of claim 9, wherein said elements of said first group are configured and positioned so that most of the capacity between said elements of said first group and said elements of said second group is provided by their adjacent edge portions and the medium adjacent thereto.

11. The apparatus of claim 10, wherein said adjacent edges of said elements of said groups are substantially parallel and at different heights.

12. The apparatus of claim 9, wherein said switch means comprise magnetically-actuatable switches.

13. The apparatus of claim 12, wherein said switches are disposed in said column.

14. The apparatus of claim 9, comprising an electrically-insulating material insulating said capacitive elements from said medium.

15. The apparatus of claim 9, wherein said first switch means are magnetically actuatable, and comprising means for moving a magnet past said switch means to actuate them sequentially.

16. The apparatus of claim 15, comprising magnet guide means disposed vertically in said column, said switch means being arranged along said guide means.

17. The apparatus of claim 16, wherein said guide means comprises a tube filled with liquid for moving said magnet means.

18. The apparatus of claim 16, wherein said guide means comprises rotatable screw means extending through said magnet means for moving said magnet means past said switch means to actuate them.

19. The apparatus of claim 16, wherein said magnet means comprises fin means for frictionally engaging said guide means.

20. The apparatus of claim 16, wherein said magnet means is of streamlined shape.

21. The apparatus of claim 16, comprising fluid-pressure means for moving said magnet means.

22. The apparatus of claim 14, wherein said electrically-insulating material comprises an insulating substance mixed with an electrically-conductive substance.

23. The apparatus of claim 22, wherein said electrically-conducting substance is a carbonaceous material.

24. The apparatus of claim 9, wherein one of said groups comprises the supporting core of said column, and is of steel.

25. The apparatus of claim 24, comprising screening electrodes between each element of said first group and said core.

* * * * *